US010452842B2

(12) United States Patent
Dhondse et al.

(10) Patent No.: US 10,452,842 B2
(45) Date of Patent: Oct. 22, 2019

(54) COGNITIVE LEARNING TO COUNTER SECURITY THREATS FOR KINEMATIC ACTIONS IN ROBOTS

(71) Applicant: International Business Machines Corporation, Armonk, NY (US)

(72) Inventors: Amol A. Dhondse, Pune (IN); Anand Pikle, Pune (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 15/616,586

(22) Filed: Jun. 7, 2017

(65) Prior Publication Data
US 2018/0357414 A1 Dec. 13, 2018

(51) Int. Cl.
*G06F 21/00* (2013.01)
*G06F 21/55* (2013.01)
(Continued)

(52) U.S. Cl.
CPC ............ *G06F 21/552* (2013.01); *B25J 9/163* (2013.01); *G05B 13/0265* (2013.01);
(Continued)

(58) Field of Classification Search
CPC .......... G06F 21/00; G06F 21/51; G06F 21/52; G06F 21/54; G06F 21/55; G06F 21/552;
(Continued)

(56) References Cited

U.S. PATENT DOCUMENTS 8,983,882 B2 3/2015 Sterritt et al.
9,317,501 B2 4/2016 Kraenzel et al.
(Continued)

OTHER PUBLICATIONS

Bonaci, Tamara, et al., "To Make a Robot Secure: An Experimental Analysis of Cyber Security Threats Against Teleoperated Surgical Robotics" [online], University of Washington, retrieved on May 23, 2017 from the Internet URL: https://arxiv.org/pdf/1504.04339.pdf (May 2015).
(Continued)

*Primary Examiner* — Edward Zee
(74) *Attorney, Agent, or Firm* — Diana R. Gerhardt; Jack V. Musgrove (57) ABSTRACT

A security control system for a kinematic robot uses a cognitive assessment agent to map proposed instructions to either legitimate or illegitimate actions based on contextual variables. The agent computes a security anomaly index score representing a variance of a likely kinematic action of the robot compared to acceptable actions. If the score exceeds a predetermined threshold, a security alert is generated for the robot's administrator. The contextual variables include a user profile, a user location, and subject matter of the kinematic actions. The analysis compares input text to predefined classification metadata, and can also compare verbal phrases or body gestures to corresponding baselines. Different numeric weights can be applied to the contextual variables. The computing begins with a default value for the score and thereafter increments or decrements the score based on the weights. The weights can be adjusted based on a supervisory appraisal of the computed score.

11 Claims, 5 Drawing Sheets

(51) Int. Cl.
G05B 13/02 (2006.01)
G06N 3/00 (2006.01)
G06N 20/00 (2019.01)
B25J 9/16 (2006.01)

(52) U.S. Cl.
CPC .............. *G06F 21/00* (2013.01); *G06F 21/55* (2013.01); *G06N 3/008* (2013.01); *G06N 20/00* (2019.01); *G06F 2221/034* (2013.01)

(58) Field of Classification Search
CPC ...... G06F 21/554; G06F 21/56; G06F 21/556; G06F 21/57
See application file for complete search history.

(56) References Cited

U.S. PATENT DOCUMENTS

| | | | |
|---|---|---|---|
| 9,524,648 B1* | 12/2016 | Gopalakrishnan | B64C 39/00 |
| 2009/0164039 A1 | 6/2009 | Jung et al. | |
| 2014/0070947 A1 | 3/2014 | Albert | |
| 2015/0283703 A1* | 10/2015 | Izhikevich | B25J 9/163 706/11 |
| 2016/0104485 A1 | 4/2016 | Allen et al. | |
| 2017/0286916 A1* | 10/2017 | Skiba | B25J 9/1689 |

OTHER PUBLICATIONS

Bonaci, Tamara, et al., "On Potential Security Threats Against Rescue Robotic Systems", Proc. IEEE Int'l. Symposium on Safety, Security, and Rescue Robotics (Nov. 2012).

Gowda, Chaitanya, "System Security, Threat Detection and Prevention Measures of Autonomous Systems", University of Texas at Arlington Thesis and Dissertation Library, Arlington, Texas (2015).

Higgins, Fiona, et al., "Threats to the Swarm: Security Considerations for Swarm Robotics", Int'l. J. on Advances in Security, v. 2, n. 2&3 (2009).

Joseph, Anthony, et al., "Machine Learning Methods for Computer Security"[online], Dagstuhl Manifestos Perspectives Workshop 12371, vol. 3, Issue 1, pp. 1-30, retrieved on May 23, 2017 from the Internet URL: http://drops.dagstuhl.de/opus/volltexte/2013/4356/pdf/dagman-v003-i001-p001-12371.pdf (2013).

Matellán, Vicente, et aL., "Cybersecurity in Robotic Systems"[online], retrieved on Dec. 20, 2016 from the Internet URL: https://ercim-news.ercim.eu/en106/special/cybersecurity-in-robotic-systems (Jul. 2016).

Morante, Santiago, "Continuous goal-directed actions: advances in robot learning", University Carlos III of Madrid Thesis Archive, Barcelona, Spain (2015).

Pleban, Johann-Sebastian, et al., "Hacking and securing the AR.Drone 2.0 quadcopter—Investigations for improving the security of a toy", Proc. Int'l. Society for Optical Engineering, v. 9030 (Mobile Devices and Multimedia: Enabling Technologies, Algorithms, and Applications) (2014.

Rich, Michael, "Machine Learning, Automated Suspicion Algorithms, and the Fourth Amendment", University of Pennsylvania Law Review, v. 164, pp. 871-929 (2016).

Vuong, Tuan, et al., "Performance evaluation of cyber-physical intrusion detection on a robotic vehicle", Int'l. Conf. on Computer and Information Technology, Ubiquitous Computing and Communications, Dependable, Autonomic and Secure Computing, Pervasive Intelligence and Computing (Oct. 2015).

* cited by examiner

| Instruction | SAI Score | Action |
|---|---|---|
| ---- | 50 | ---- |
| Move robotic arm to handshake position | 45 | Move arm |
| Say "Hello, please give me your hand." | 40 | Speech |
| Sense patient hand | 40 | Wait for sensory input |
| Say "This is how you sing." | 55 | Speech |
| Squeeze until pneumatic pressure = 123 | 80 | Send Alarm, interrupt control |

*FIG. 5*

COGNITIVE LEARNING TO COUNTER SECURITY THREATS FOR KINEMATIC ACTIONS IN ROBOTS

BACKGROUND OF THE INVENTION

Field of the Invention

The present invention generally relates to electronic control systems, and more particularly to a method of controlling robotic machines.

Description of the Related Art

Humanoid and tele-operated robots are playing an increasingly important role in domestic, manufacturing and medical services. While robots can greatly simplify human endeavors and offer beneficial outcomes, they present an opportunity for malicious actors (hackers) to wreak havoc on these systems. Such tampering can result in serious bodily injury, financial damage, and less tangible harm such as privacy invasions. The possibility of unpleasant results from these intrusions is growing as robots increasingly display characteristics such as autonomy, decentralized control, collective emergent behavior, and local sensing and communication capabilities. In many cases these robots will serve in extreme conditions, where they have to operate in low-power and harsh terrain with potentially unstable connectivity.

The open and uncontrollable nature of the communication medium opens these systems to a variety of possible cyber security vulnerabilities. There may be a direct attack on the robot, e.g., via wireless communications, or an indirect attack on the computer systems controlling these robots, compromising robot operation. In an industrial setting, a hack meant to simply disrupt a system could end up affecting the quality of an entire line of products (e.g., automobiles with faulty construction) or halting a manufacturing run completely, costing millions of dollars in productivity. In a personal setting, a hacked service robot could injure a family member, dispense the wrong medication in an elder care facility, or provide a hacker with a detailed map of your home.

Threats can be in the form of intentional manipulation attacks which occur when an attacker modifies feedback messages (e.g., video feed, haptic feedback), originating from a robot, which may be harder to detect and prevent. In other kinds of attacks, a malicious entity may cause the robot to completely ignore the instructions of a legitimate user, and to instead perform some other, potentially harmful actions that can be either very discreet or very noticeable. In certain cases, a network observer may eavesdrop on information exchange between the user and a robot, and based on the collected information, start inserting poison messages into the network, while still allowing both the benign parties to communicate directly. In message dropping attacks, an intermediary may delay or drop some or all of the received messages, possibly both to and from the human operators.

Solutions have been offered to address cyber security for robotic systems. These solutions include blanket and/or static means for security by way of pre-defined rules, blacklisting, in-flight data encryption or other masking/encoding techniques.

SUMMARY OF THE INVENTION

The present invention in at least one embodiment is generally directed to a method of countering security threats for kinematic actions in robots by receiving input instructions for a kinematic robot, conducting an analysis of the input instructions using a cognitive system which maps proposed instructions to either legitimate behavioral actions or illegitimate behavioral actions based on contextual variables relating to a context of the input instructions, computing a security anomaly index score based on the analysis wherein the security anomaly index score represents a variance of a likely kinematic action of the robot in response to the input instructions compared to acceptable actions, determining that the security anomaly index score exceeds a predetermined threshold, by executing fourth instructions in the computer system, and responsively generating a security alert for an administrator of the kinematic robot. The contextual variables can include a user profile, a user location, and subject matter of the kinematic actions. The analysis can include comparing one or more input phrases from the input instructions to predefined classification metadata, as well as comparing one or more verbal phrases or body gestures to corresponding baselines. Different numeric weights can be applied to the contextual variables, and the computing begins with a default value for the security anomaly index score and thereafter increments or decrements the security anomaly index score based on the weights. Additional input instructions for the kinematic robot can be received, repeating the analysis and computation while using different values for the weights. The weights can be adjusted based on a supervisory appraisal of the computed security anomaly index score.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Robotic systems are becoming increasingly pervasive in all facets of human existence, drawing the attention of hackers who may want to impair such systems whether for financial gain or out of pure spite. While solutions have been offered to combat cyber security threats to robotic systems, these solutions often fall short and do not prevent serious intrusions. In particular, they fail to provide any mechanism to accurately distinguish between legitimate instructions and potentially disruptive ones.

It would, therefore, be desirable to devise an improved method of countering security threats which could allow a robotic system to make threat assessments regarding proposed instructions to the system. It would be further advantageous if the method could provide the ability for a robotic system to autonomously learn to secure its controlling and distributed systems, for identification and mitigation of evolving and dynamic security threats. These challenges are overcome in various embodiments of the present invention by using machine learning techniques to make a threat assessment regarding input instructions to a robot, in verbal as well as audio/video format, using deep learning algorithms to recognize and identify anomalies in the speech/text/content mapped to robotic actions. In an illustrative implementation, a cognitive security control system for a kinematic robot builds an evolving repository of instruction-action linkages mapping legitimate and illegitimate behavioral actions, in the context of surrounding variables such as user/organization type and situation (such as tone, mood etc.), geographic or cultural location, subject and patterns in the conversation, and so on. The cognitive security control system can use a continuous feedback loop by which it observes verbal/written instructions from users/machines and identifies the level of variance in terms of observed actions/outcomes, to determine a security anomaly index (SAI) score using cognitive analysis, based on input from security experts as well as industry/domain/organizational input, best practices, known risks, etc. In one embodiment the present invention achieves these objectives by processing input text/audio/video segments along with other input criteria (such as location, time, conversation topic, tone/mood, user category, etc.), in either a supervised training mode or a run-time mode. In supervised mode, the system can perform a supervised review against expected outputs (of the anomaly index), and adjust weights of each input criteria to derive an output as close as possible to the expected output. The algorithm can evolve the classification rules for identifying anomalies by analyzing a training set and applying the rules to a test verification set. In run-time mode, the system can iteratively assess verbiage/words for anomalies as a conversation progresses, and determine the anomaly index using the classification rules developed based on training and historical data. An alert is generated in case the anomaly index rises above a pre-defined threshold.

Figure 1:
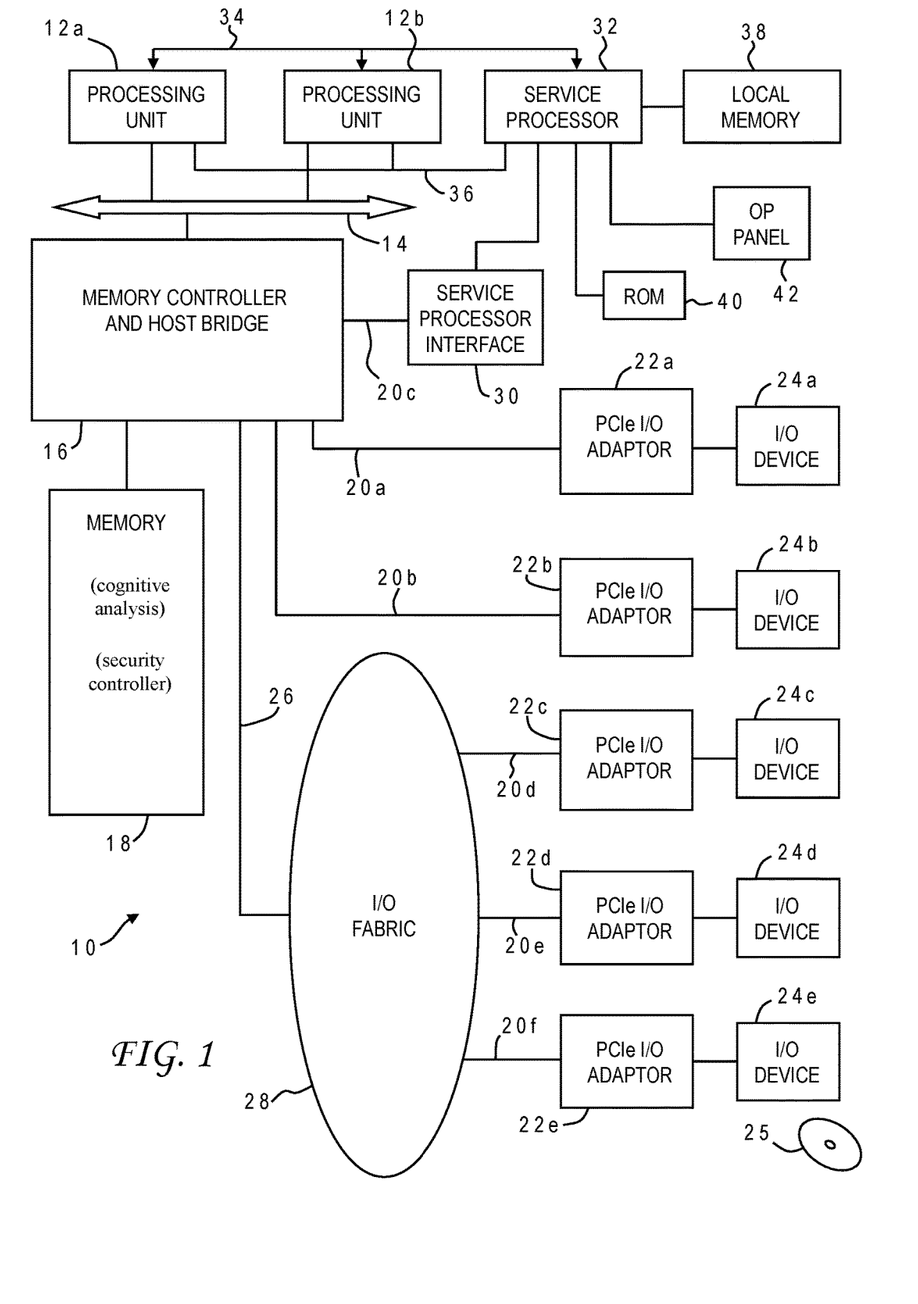
FIG. 1 is a block diagram of a computer system programmed to carry out the detection and countering of security threats for kinematic actions in robots in accordance with one implementation of the present invention.

With reference now to the figures, and in particular with reference to FIG. 1, there is depicted one embodiment 10 of a computer system in which the present invention may be implemented to carry out cognitive learning to counter security threats in kinematic robots. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein a cognitive analysis (deep learning) application in accordance with the present invention, and may further include a security controller for the robotic system.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the cognitive control system of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for countering security threats in kinematic robots that use novel cognitive analysis techniques to detect instruction anomalies. Accordingly, a program embodying the invention may additionally include conventional aspects of various cognitive analysis tools, and these details will become apparent to those skilled in the art upon reference to this disclosure. A cognitive system (sometimes referred to as a deep learning, deep thought, or deep question answering system) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network based on animal visual perception, and so is particularly useful in processing image data. Convolutional neural networks are similar to ordinary neural networks but are made up of neurons that have learnable weights and biases.

A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

Figure 2:
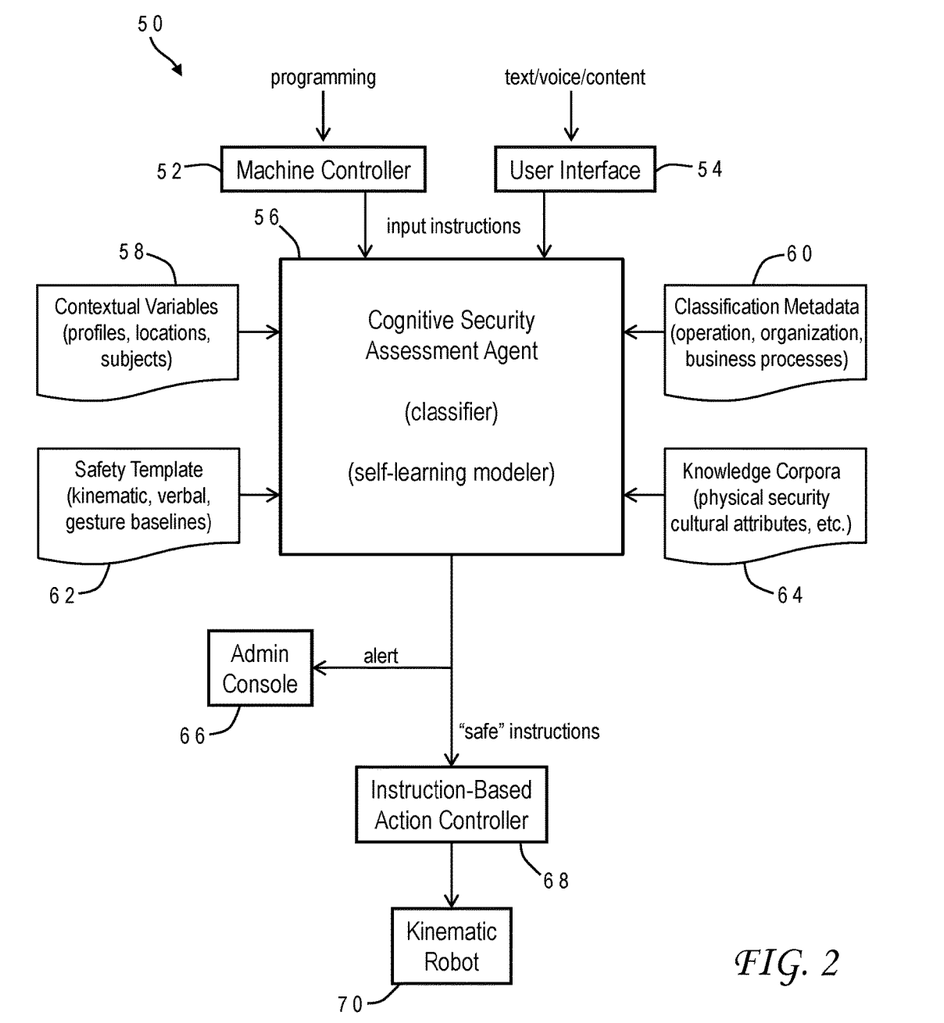
FIG. 2 is a block diagram of a cognitive security control system for a kinematic robot in accordance with one implementation of the present invention.

Referring now to FIG. 2, there is depicted a block diagram for a cognitive security control system 50 for a kinematic robot in accordance with one implementation of the present invention. Cognitive security assessment agent 56 may run on any computer system, such as computer system 10. According to this implementation, instructions for a kinematic robot 70 originate either from a machine via a machine controller 52 or from a human user via a user interface 54. Instructions from machine controller 52 may be made by way of programming, using a separate computer or control system. Instructions from user interface 54 may be derived from various forms of user input including text, voice, or other content, e.g., visual. Machine controller 52 and user interface 54 may be conventional. The instructions are monitored by a cognitive security assessment agent 56, i.e., intercepted before they are passed onto the kinematic robot 70.

Cognitive security assessment agent 56 uses deep learning technology to analyze each of the input instructions from machine controller 52 or user interface 54. This technology may include a classifier. For example, natural language classifiers are commonly used in natural language processing systems to identify the type of discourse in connected text, e.g., a yes/no question, a content question, a statement, an assertion, etc. This service enables developers without a background in machine learning or statistical algorithms to create natural language interfaces for their applications. A classifier can interpret the intent behind commands and returns a corresponding classification with associated confidence levels. The return value can then be used to trigger a corresponding action. For example, the IBM Watson™ natural language classifier service applies deep learning techniques to make predictions about the best predefined classes for short sentences or phrases. Cognitive security assessment agent 56 also preferably includes a self-learning modeler which allows the accuracy of the analysis to improve over time using periodic training and feedback from security experts who can provide feedback on the quality of results. Scoring and classification of suspicious instructions in natural language text/audio/video communications can be based on historical and contextual information, with the potential for higher variance in resultant action/behavior. These features of cognitive security assessment agent 56 can utilize various predefined data including contextual variables 58 such as profiles, locations, and subjects, classification metadata 60 including operational data, business process patterns, and organization dictionaries, safety templates 62 providing kinematic, verbal and gesture baselines, and knowledge corpora 64 which define instruction-action associations relating to physical security, cultural attributes, etc., to recognize and identify variation in patterns of speech/text/content. Various features of the invention including the cognitive security assessment agent could be incorporated into the robot itself.

Cognitive security assessment agent 56 carries out a cognitive analysis on the input phrases to generate a security anomaly index (SAI) score which is used to make a threat assessment. In one implementation, if the SAI score is higher than a predetermined threshold then the input instructions are deemed suspicious/threatening, and cognitive security assessment agent 56 will suspend execution of the instructions and send an alert, e.g., to a console 66 for an administrator of the robot. Only when the instructions are deemed "safe", are they then forwarded to an instruction-based action controller 68 which then applies them to robot 70.

One solution proposed by the present invention can build and leverage instruction-action linkages based on the robot's previous interactions to derive extended relationships and aggregated insights, using associations of legitimate behavioral actions with a combination of various hierarchical information. In a preferred implementation, the information may include (i) a hierarchy of profiles (demographic/organizational) matching different users' persona types, (ii) a hierarchy or map of locations (country, region, province, city, suburb, etc.), (iii) a hierarchy of commands from a dictionary of topic/subject area, and (iv) a hierarchy of kinematic actions. This implementation is reflected in FIG. 3 which illustrates an object model 80 for building instruction-action linkages. According to this example, the input instructions emanate from an individual named John Doe who is residing in the Tuscany region of Italy. The command relates to food processing (culinary), in this case, cutting, and involves action by the upper arms of the kinematic robot. These and other attributes of the input instruction are combined to create a security-based kinematic action linkage (SKAL).

Figure 3:
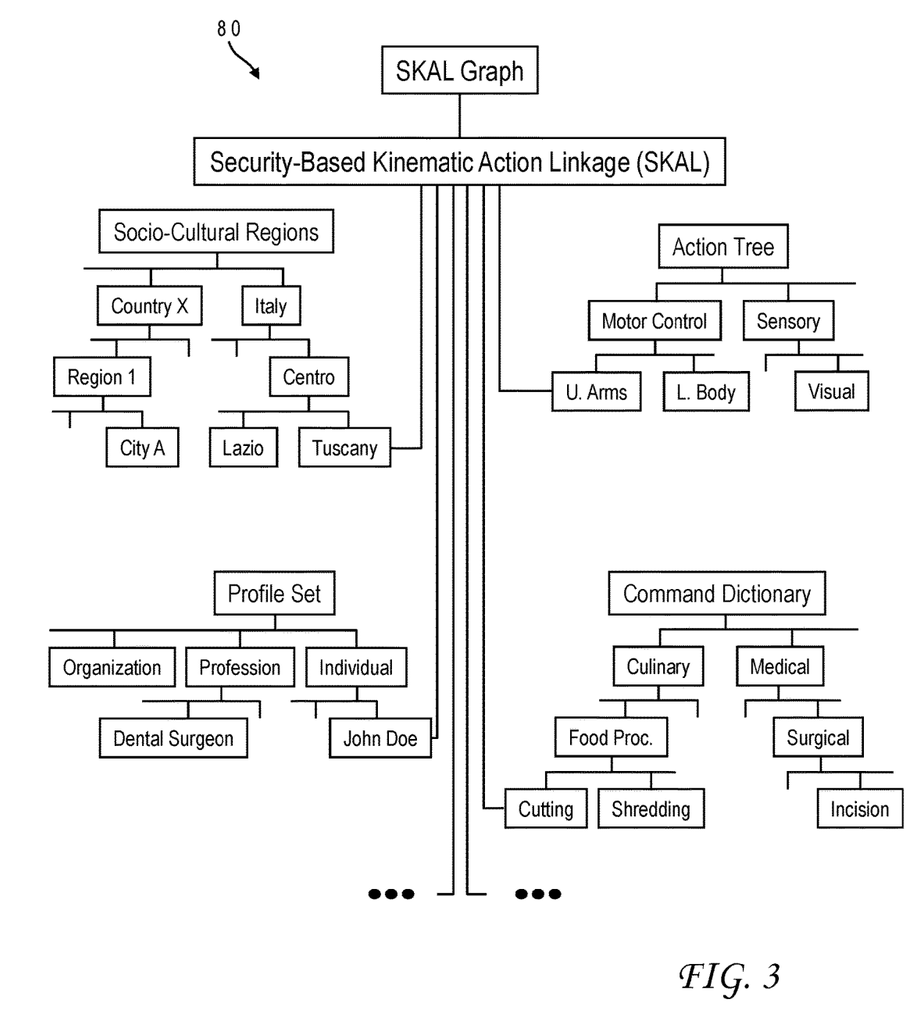
FIG. 3 is a pictorial representation of an object model for building instruction-action linkages to help identify possible security threats in accordance with one implementation of the present invention.

The SKAL graph thereby produced can be compared to other SKAL graphs from both legitimate and illegitimate instructions to iteratively and dynamically assess input instructions and vary the confidence score. Different numeric weights can be applied to the contextual variables, and the confidence score can be based on changing weights as a conversation progresses. The apparatus can thus leverage prior conversational context in determining subsequent matches. These deep learning techniques can be used to categorize and rank specific instructions (phrases/gestures/body language) based on higher semantic and functional association to a particular subject area or industry-domain practices. The algorithm can evolve the classification rules for identifying anomalies by analyzing a training set and applying them to a test verification set.

Figure 4:
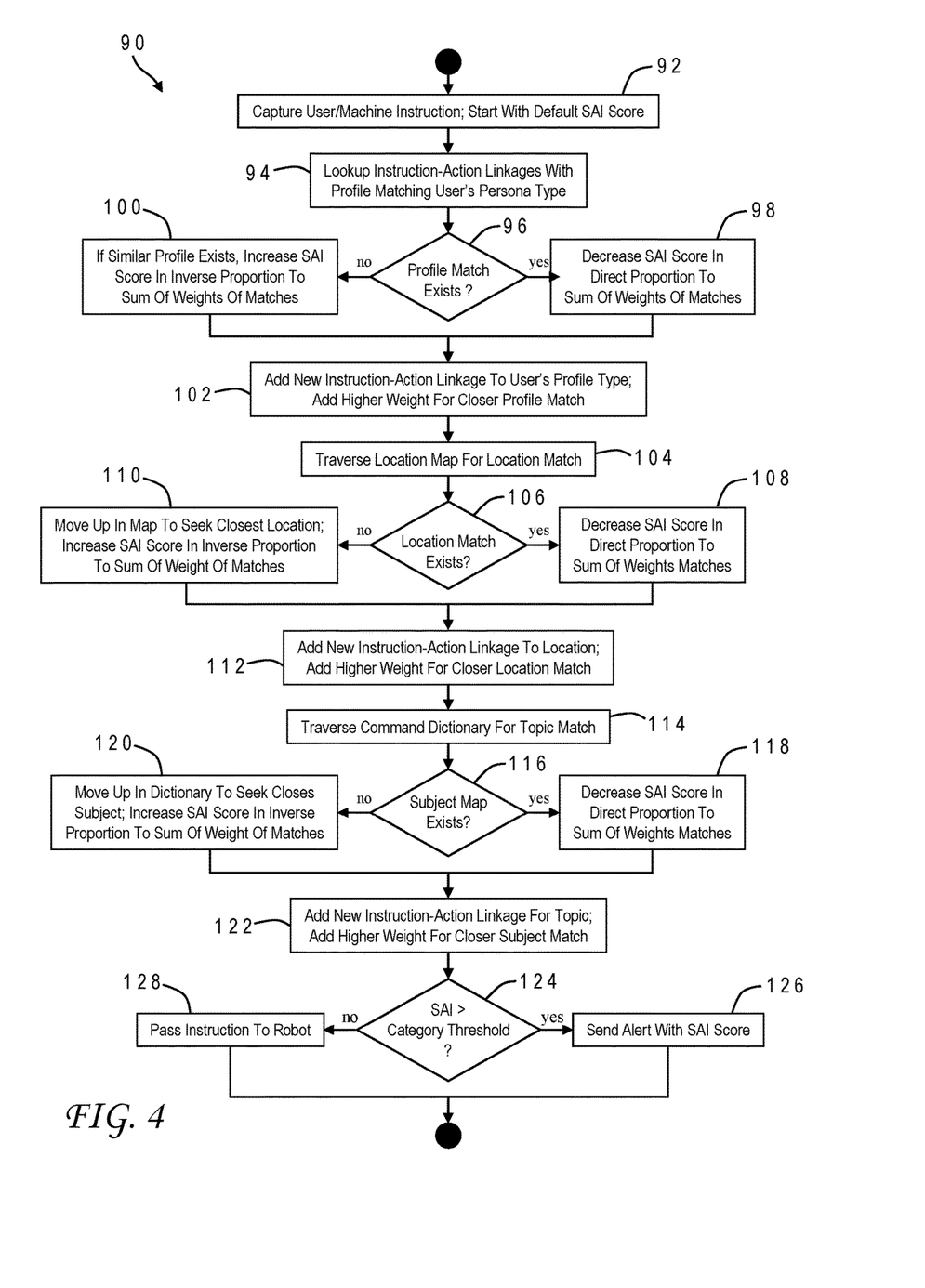
FIG. 4 is a chart illustrating the logical flow for a robotic security control process in accordance with one implementation of the present invention.

The present invention may be further understood with reference to the chart of FIG. 4 which depicts the logical flow for a robotic security control process 90 carried out by cognitive agent 56 in accordance with one implementation. Process 90 begins with a capture of input instructions from a machine or user (92). The process can initialize the SAI score at a default value. Various instruction-action linkages are then examined. First, the agent can look up instruction-action linkages with profile matching based on the user's persona type (94). If a profile match exists (96), then the SAI score is decreased in direct proportion to the sum of the weights for the matching criteria, i.e., the score is lowered to reflect increased confidence in the safety of the instructions. If no profile match exists, the SAI score can be increased in inverse proportion to the sum of weights of matches of the closest similar profile (100), i.e., raising the score to reflect concern that the instructions are suspicious. A new instruction-action linkage can then be added to the user's profile type, with a higher weight for closer profile matching (102). Agent 56 can then traverse the location map associated with the input instructions to see if there is a matching location (104). If a location match exists (106), the SAI score is again decreased (108), but if not, the SAI score is again increased (110). A new instruction-action linkage is added to the locations, again with a higher weight for closer location matching (112). Agent 56 can then the command dictionary associated with robot to see if the input instructions match a topic (114). If a subject match exists (116), the SAI score is again decreased (118), but if not, the SAI score is again increased (120), and another new instruction-action linkage is added for this topic, with a higher weight for closer subject matching (112). The resulting SAI score is then compared to a threshold score for this robot category (124). If the score is greater than the threshold, an alert is sent to the robot administrator along with the SAI score and possibly other related information including the suspect input instruction (126). If the score is less than the threshold, the instructions are passed on to the robot for execution (128).

A system in accordance with the present invention may thus find applicability in a wide variety of circumstances to passively observe speech/text/video input to identify instructions resulting in kinematic actions that have higher security anomaly index scores than suitable thresholds, based on machine learning models to observe, score and determine suspicious content based on historical datasets, including labeled attack data, and situational parameters; for example, in the case of a robotic surgery, a much more stringent anomaly threshold may be applied to instructions that seem out of normal sequence. The cognitive agent can provide the ability to interactively and iteratively assess security anomalies based on phrases/gestures/body language/voice intonation by dynamically varying the score based on change in weights as the interaction progresses; for example, a robotic receptionist may leverage prior conversational context about a visitor's background in determining that a subsequent instruction asking to lookup personal details of a co-visitor is suspicious. Differential security may be provided based on a range of inputs such as security experts who can provide feedback on quality of resultant kinematic behavior, as well as domain/industry practices and case history, by using deep learning techniques to categorize sensitive behavior/actions based on higher semantic and functional alignment to that domain than other case artifacts; for example, to rate an instruction to a service robot in a restaurant to heat a beverage above human-drinkable threshold as suspicious.

Figure 5:
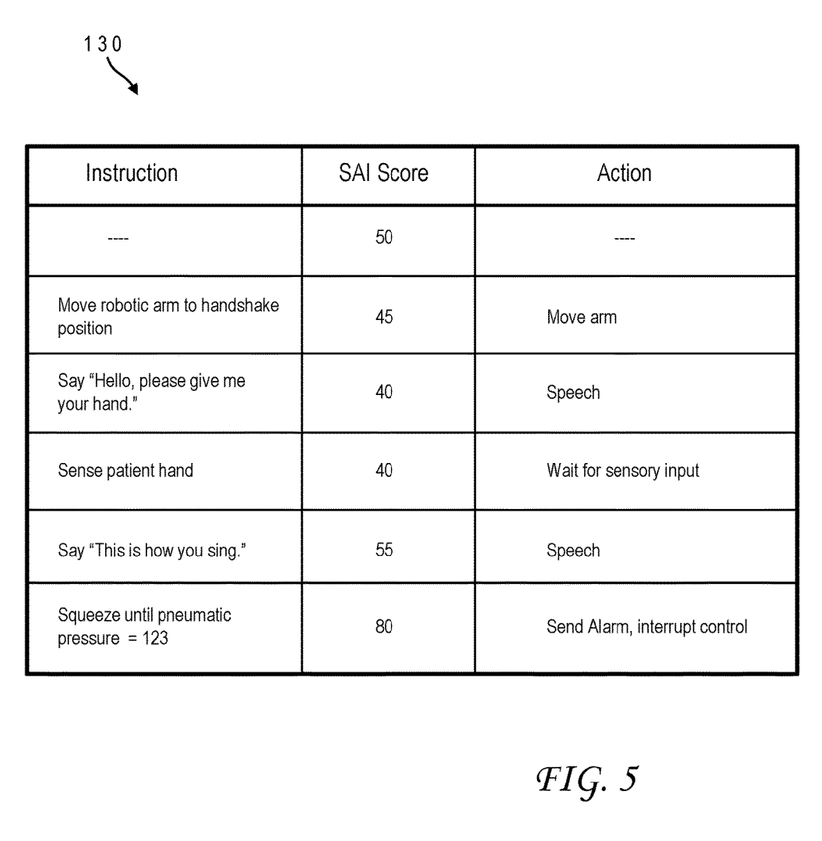
FIG. 5 is a table providing an example of received robotic instructions which affect a security anomaly index (SAI) score and resulting actions in accordance with one implementation of the present invention.

An example of how the SAI score might be generated as a conversation of instructions progresses in seen in FIG. 5. This example is for a nurse robot performing a preliminary screening of an individual who may have an injured hand, but the instruction sequence has been tampered with in an attempt to carry out intentional harm. When the screening begins, the cognitive agent has set the score to a default value of 50. The first instruction is to move the arm of the robot to a handshake position, to prepare for inspection of the patient's hand. This instruction is deemed normal/safe by the cognitive system, so the score is decreased to 45, and the agent passed the instruction to the robot which moves its arm accordingly. The second instruction is to have the robot issue the statement "Hello, please give me your hand." This instruction is also deemed normal/safe so the score is again decreased, this time to 40, and the instruction is passed to the robot which uses a text-to-speech function to audibly deliver the statement. The third instruction is to sense the patient's hand, which is considered normal/safe but is not deemed significant enough by the cognitive agent to change the score, which remains at 40, so the instruction passes and the robot waits for sensory input indicating that the patient has placed his hand at the robotic arm. The next instruction is to have the robot issue the statement "This is how you sing" which is considered anomalous based on the cognitive analysis. The result is an increase in the SAI score to 55; however, for this example the threshold is set at 75 so the robot is allowed to proceed with this speech delivery. Finally, an instruction is given to squeeze the robotic hand until the pneumatic pressure is a certain value. This value is deemed to be dangerous by the cognitive agent which raises the score, this time to 80, which exceeds the threshold. The resulting action is to interrupt control of the robot and send an alarm.

A cognitive agent constructed in accordance with the present invention may thus be easily inserted within existing frameworks for controlling actions of kinematic robots. The apparatus can be used in traditional settings as well as in IaaS (Infrastructure as a Service) and PaaS (Platform as a Service) based offerings. The apparatus can also be leveraged in Cognitive, Big Data and Analytics solutions to provide business and commercial value.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer system comprising:
one or more processors which process program instructions;
a memory device connected to said one or more processors; and
program instructions residing in said memory device for countering security threats for kinematic actions in robots by receiving input instructions for a kinematic robot, conducting an analysis of the input instructions using a cognitive system which maps proposed instructions to either legitimate behavioral actions or illegitimate behavioral actions based on contextual variables relating to a context of the input instructions, computing a security anomaly index score based on the analysis wherein the security anomaly index score represents a variance of a likely kinematic action of the kinematic robot in response to the input instructions compared to acceptable actions, different numeric weights are applied to the contextual variables, and the computing begins with a default value for the security anomaly index score and thereafter increments or decrements the security anomaly index score based on the weights, determining that the security anomaly index score exceeds a predetermined threshold, and responsively generating a security alert for an administrator of the kinematic robot.

2. The computer system of claim 1 wherein the contextual variables include a user profile, a user location, and subject matter of the kinematic actions.

3. The computer system of claim 1 wherein the analysis includes comparing one or more input phrases from the input instructions to predefined classification metadata.

4. The computer system of claim 1 wherein the analysis includes comparing one or more verbal phrases or body gestures to corresponding baselines.

5. The computer system of claim 1 wherein the input instructions are first input instructions, and said program instructions residing in said memory device further receive second input instructions for the kinematic robot, and repeat the conducting and the computing for the second input instructions while using different values for the weights.

6. The computer system of claim 1 wherein said program instructions residing in said memory device further receive a supervisory appraisal of the computed security anomaly index score, and adjust the weights based on the supervisory appraisal.

7. A computer program product comprising:
a computer readable storage medium; and
program instructions residing in said computer readable storage medium for countering security threats for kinematic actions in robots by receiving input instructions for a kinematic robot, conducting an analysis of the input instructions using a cognitive system which maps proposed instructions to either legitimate behavioral actions or illegitimate behavioral actions based on contextual variables relating to a context of the input instructions, computing a security anomaly index score based on the analysis wherein the security anomaly index score represents a variance of a likely kinematic action of the kinematic robot in response to the input instructions compared to acceptable actions, different numeric weights are applied to the contextual variables, and the computing begins with a default value for the security anomaly index score and thereafter increments or decrements the security anomaly index score based on the weights, determining that the security anomaly index score exceeds a predetermined threshold, and responsively generating a security alert for an administrator of the kinematic robot.

8. The computer program product of claim 7 wherein the contextual variables include a user profile, a user location, and subject matter of the kinematic actions.

9. The computer program product of claim 7 wherein the analysis includes comparing one or more input phrases from the input instructions to predefined classification metadata.

10. The computer program product of claim 7 wherein the analysis includes comparing one or more verbal phrases or body gestures to corresponding baselines.

11. The computer program product of claim 7 wherein the input instructions are first input instructions, and said program instructions further receive second input instructions for the kinematic robot, and repeat the conducting and the computing for the second input instructions while using different values for the weights.

* * * * *